United States Patent
Suzuki et al.

(10) Patent No.: US 10,804,011 B2
(45) Date of Patent: Oct. 13, 2020

(54) FLAT CABLE, ROTARY CONNECTOR USING THE SAME, AND METHOD FOR PRODUCING FLAT CABLE

(71) Applicants: FURUKAWA ELECTRIC CO., LTD., Tokyo (JP); FURUKAWA AUTOMOTIVE SYSTEMS INC., Inukami-gun (JP)

(72) Inventors: Yutaka Suzuki, Tokyo (JP); Michimasa Watanabe, Tokyo (JP); Haruki Watabe, Tokyo (JP); Kenji Hiroki, Inukami-gun (JP)

(73) Assignees: FURUKAWA ELECTRIC CO., LTD., Tokyo (JP); FURUKAWA AUTOMOTIVE SYSTEMS INC., Inukami-gun (JP)

(*) Notice: Subject to any disclaimer, the term of this patent is extended or adjusted under 35 U.S.C. 154(b) by 0 days.

(21) Appl. No.: 16/275,740

(22) Filed: Feb. 14, 2019

(65) Prior Publication Data
US 2019/0189308 A1 Jun. 20, 2019

Related U.S. Application Data

(63) Continuation of application No. PCT/JP2017/026438, filed on Jul. 21, 2017.

(30) Foreign Application Priority Data

Aug. 23, 2016 (JP) .................... 2016-162514

(51) Int. Cl.
*H01B 7/08* (2006.01)
*H01B 13/06* (2006.01)
(Continued)

(52) U.S. Cl.
CPC .............. *H01B 13/06* (2013.01); *G02B 6/44* (2013.01); *G02B 6/443* (2013.01); *G02B 6/448* (2013.01);
(Continued)

(58) Field of Classification Search
CPC ...................................... H01B 13/06
(Continued)

(56) References Cited

U.S. PATENT DOCUMENTS 4,783,579 A * 11/1988 Brandolf .............. H01B 7/0823
174/117 FF
6,042,902 A * 3/2000 Kuder ...................... B32B 7/12
428/1.33
(Continued)

FOREIGN PATENT DOCUMENTS

CN 102280181 A 12/2011
CN 102732171 A 10/2012
(Continued)

OTHER PUBLICATIONS

International Search Report dated Sep. 12, 2017 in PCT/JP2017/026438 filed Jul. 21 2017 (with English Translation).
(Continued)

*Primary Examiner* — Stanley Tso
(74) *Attorney, Agent, or Firm* — Oblon, McClelland, Maier & Neustadt, L.L.P.

(57) ABSTRACT

A flat cable 10 according to the invention has a plurality of arrayed conductors 11; and an insulating layer 12 covering the periphery of the conductors 11 with a coating film, in which the insulating layer 12 includes a plurality of layers, the outermost layer 13 of the insulating layer 12 and the innermost layer 14 contacting the conductors are both formed from polyphenylene sulfide-based resins, and the melting point of the polyphenylene sulfide-based resin con-
(Continued)

stituting the innermost layer 14 is lower by 5° C. or more than the melting point of the polyphenylene sulfide-based resin constituting the outermost layer 13.

5 Claims, 4 Drawing Sheets

(51) Int. Cl.
H01R 35/04 (2006.01)
H01B 7/02 (2006.01)
G02B 6/44 (2006.01)
H01B 13/00 (2006.01)
H01B 3/30 (2006.01)

(52) U.S. Cl.
CPC ......... *G02B 6/4436* (2013.01); *G02B 6/4486* (2013.01); *H01B 3/301* (2013.01); *H01B 7/02* (2013.01); *H01B 7/0216* (2013.01); *H01B 7/08* (2013.01); *H01B 13/00* (2013.01); *H01B 13/0016* (2013.01); *H01R 35/04* (2013.01); *H01B 13/0003* (2013.01); *H01R 2201/26* (2013.01)

(58) Field of Classification Search
USPC ....................................................... 174/117 F
See application file for complete search history.

(56) References Cited

U.S. PATENT DOCUMENTS

| 2002/0117495 | A1* | 8/2002 | Kochman | H05B 3/34 |
| | | | | 219/549 |
| 2003/0019659 | A1 | 1/2003 | Yamanobe et al. | |
| 2006/0249298 | A1* | 11/2006 | Reece | B05D 5/08 |
| | | | | 174/110 R |
| 2011/0232938 | A1* | 9/2011 | Kodama | H01B 7/0838 |
| | | | | 174/117 F |
| 2012/0255761 | A1 | 10/2012 | Shanai et al. | |
| 2012/0267164 | A1* | 10/2012 | Reuss | H02G 11/006 |
| | | | | 174/70 R |
| 2013/0255992 | A1 | 10/2013 | Yamazaki et al. | |
| 2014/0131064 | A1 | 5/2014 | Yamada | |
| 2014/0158398 | A1* | 6/2014 | Shanai | H01B 3/421 |
| | | | | 174/117 F |
| 2018/0182511 | A1* | 6/2018 | Tanaka | H01B 7/0208 |

FOREIGN PATENT DOCUMENTS

| CN | 103650068 A | | 3/2014 | |
| CN | 103733275 A | | 4/2014 | |
| DE | 6981818912 | * | 10/1997 | ............ B32B 27/08 |
| JP | 2003-31034 A | | 1/2003 | |
| JP | 2007-87663 | | 4/2007 | |
| JP | 2009-076281 | * | 4/2009 | .............. H01B 7/08 |
| JP | 2009-76281 | | 4/2009 | |
| JP | 2013-30327 | | 2/2013 | |
| JP | 2014-17163 A | | 1/2014 | |
| KR | 10-2008-0041151 A | | 5/2008 | |
| WO | WO 2007/081372 A1 | | 7/2007 | |
| WO | WO 2013/014903 A1 | | 1/2013 | |

OTHER PUBLICATIONS

Combined Chinese Office Action and Search Report dated Sep. 4, 2019 in Patent Application No. 201780032831.9 (with Partial unedited computer generated English translation and English translation of categories of cited documents) citing documents AA, AO-AR therein, 22 pages.

Supplemental Partial European Search Report dated Mar. 16. 2020 in European Patent Application No. 17843279.5, citing documents AA and AO, therein. 8 pages.

Office Action dated May 18, 2020, in Chinese Patent Application No. 201780032831.9 (with English-language translation).

Office Action dated Jun. 19, 2020, in Korean Patent Application No. 10-2018-7033597 (with English-language translation).

* cited by examiner

FLAT CABLE, ROTARY CONNECTOR USING THE SAME, AND METHOD FOR PRODUCING FLAT CABLE

TECHNICAL FIELD

The present invention relates to a flat cable used for, for example, a rotary connector to be mounted in a vehicle, a rotary connector using the flat cable, and a method for producing a flat cable.

BACKGROUND ART

Flat cables are widely utilized in various places. For example, a rotary connector for a vehicle, which is used for a steering device, is furnished with a flat cable having excellent flexibility as an electric wiring body. The steering device and the vehicle are electrically connected by a flat cable in a rotary connector, and the flat cable plays the role of causing signals or electric power from the vehicle side to flow into various switches inside the steering device. For example, a detonating signal for activating an airbag at the time of an accident is also transmitted through a flat cable.

In recent years, due to the progress in the information technology concerning vehicles and the diversification of users' needs, the electric current flowing through a flat cable flows into multiple circuits in large quantities. For example, in a vehicle equipped with a steering heater function that warms the steering device so that the driver does not feel cold on the steering device on cold days, a large current for heating flows through a flat cable. Along with such multi-circuiting and capacity increase of flowing current, there is an increasing demand for a flat cable having high heat resistance and high flame retardance.

Furthermore, there is a demand for size reduction of rotary connectors where flat cables are accommodated. Therefore, it is expected that in the future, flat cables will be used in environments where heat dissipation is more difficult. For example, in a case in which a vehicle is parked for a long time in hot weather during the summer, the temperature inside a small-sized rotary connector may reach about 80° C. Therefore, even for a vehicle that is not equipped with the steering heater function mentioned above as an example, a flat cable having heat resistance and flame retardance, which can be used even in such a high-temperature region is needed.

In the case of conventional flat cables, polyester-based resins are generally used for the insulating coating; however, there is a problem that the resins undergo degeneration at a high temperature such as 80° C. Since polyester-based materials have their glass transition temperatures near 70° C., in a case in which a polyester-based material is used in a flat cable, when the polyester-based material is heated to a temperature higher than about 70° C., there occurs a phenomenon in which the shape is remembered (heat setting phenomenon) when the material is heated and then cooled again.

It is speculated that this shape memory property is exhibited because when the temperature rises above 70° C., which is near the glass transition temperatures of polyesters, a polyester enters the rubbery state so that the molecular chains in the amorphous part can move freely, and when the temperature is lowered, the amorphous part is constrained again as the polyester is returned to the glassy state.

A flat cable in which the insulating coating has exhibited the heat setting phenomenon enters a curled state in a rotary connector due to shape memory. Since a plurality of flat cables is disposed in a rotary connector as shown in FIG. 1 (four flat cables in FIG. 1), when curled flat cables are brought into contact with one another, there is a problem that abnormal noises are generated and defects such as a winding collapse occur.

In order to avoid such problems, it may be considered to use materials other than polyester-based materials as the insulating film. However, materials respectively have problems, for example, vinyl chloride has low heat resistance; polycarbonates have low chemical resistance; polyetherimides have low flexibility; and polyimides are very expensive. When a cycloolefin-based resin having a melting point that is as high as about 250° C. is used, as will be described below, the cycloolefin-based resin swells due to a lubricating agent (lubricant oil) containing a hydrocarbon-based material, which is used at the time of mounting flat cables in a rotary connector. As a result, the film thickness of the flat cables becomes non-uniform, load is concentrated on thin parts, and thus, durability is decreased.

Patent Document 1 discloses a flat cable in which a polyphenylene sulfide (PPS)-based resin is used for the insulating film. Since PPS has a glass transition temperature that is as high as about 90° C., even in a case in which a vehicle is parked for a long time in hot weather during the summer, the heat setting phenomenon is not likely to be exhibited. A PPS-based resin has a melting point that is as high as about 280° C., has high heat resistance, high flame retardance, and high flexibility, and does not have a problem of swelling caused by a lubricating agent. Therefore, a PPS-based resin exhibits excellent durability when mounted in a rotary connector.

CITATION LIST

Patent Document

Patent Document 1: JP 2013-30327 A

SUMMARY OF THE INVENTION

Problem to be Solved by the Invention

However, since the flat cable disclosed in Patent Document 1 is produced by extrusion molding, the production cost is so high that it is very difficult to put the flat cable to practical use. In the case of extrusion molding, an extrusion head and nozzle caps are needed for each case of specifications such as the thickness, width, number of units, and sequence of the conductor. Therefore, in order to cope with flat cables of a variety of specifications, enormous capital investment is required.

Furthermore, in a case in which the conductor is as thin as several ten micrometers ($\mu$m), a drawback that the conductor is cut by extrusion molding is likely to occur, and when the rate of extrusion molding is suppressed in order to prevent this drawback, there occurs a problem that the time required for the production is lengthened. In order to shorten the production time, a method of arranging multiple flat cables in parallel and performing extrusion may also be considered; however, in that case, the manufacturing apparatus must become large-sized in order to cope with a wide nozzle cap, and the facility investment is further increased.

Generally, with regard to PPS-based resins, the raw materials themselves are expensive compared to the polyester-based resins and the like of conventional products. In addition to that, enormous capital investment is needed due to the extrusion molding process described above, and consequently, practical use of PPS-based resins is not likely to be realized from the viewpoint of production cost.

In regard to the production achieved by extrusion molding, in a case in which a plurality of conductors having different thicknesses or widths is incorporated into a same flat cable, it is technically difficult to uniformly extrude the resin that becomes the insulating coating. Specifically, there is a difficulty that in a region where the distance between conductors is wide, the resin is extruded in a large amount that is more than needed, and in a region where the distance is narrow, the resin is extruded only in a small amount that is below the required amount. Therefore, the degree of freedom in design is restricted.

The invention was achieved as a result of addressing the problems described above, and it is an object of the invention to provide a flat cable made of an inexpensive PPS-based resin that exhibits excellent heat resistance, flame retardance, flexibility, and durability and can be produced easily; a rotary connector using this flat cable; and a method for producing the flat cable.

Means for Solving Problem

In order to solve the problems described above, the flat cable according to the invention comprises a plurality of arrayed conductors; and an insulating layer covering the periphery of the conductors with a coating film, wherein the insulating layer includes a plurality of layers, the outermost layer of the insulating layer and the innermost layer contacting the conductor are both formed from polyphenylene sulfide-based resins, and the melting point of the polyphenylene sulfide-based resin that constitutes the innermost layer is lower by 5° C. or more than the melting point of the polyphenylene sulfide-based resin that constitutes the outermost layer.

In order to solve the problems described above, the flat cable according to the invention comprises a plurality of arrayed optical fibers; and a protective layer covering the periphery of the optical fibers with a protective material, wherein the protective layer includes a plurality of layers, the outermost layer of the protective layer and the innermost layer contacting the optical fibers are both formed from polyphenylene sulfide-based resins, and the melting point of the polyphenylene sulfide-based resin that constitutes the innermost layer is lower by 5° C. or more than the melting point of the polyphenylene sulfide-based resin that constitutes the outermost layer.

In the flat cable, the outermost layer may be a crosslinked layer, and the innermost layer may be a non-crosslinked layer.

In order to solve the problems described above, the rotary connector according to the invention has the aforementioned flat cable installed therein.

In regard to the rotary connector, it is preferable that the outer surface of the flat cable installed therein and the inner circumferential surface of the exterior case are coated with a lubricating agent containing a hydrocarbon-based material.

In regard to the rotary connector, it is preferable that the minimum bending radius of the flat cable installed therein is from 3 mm to 8 mm.

In regard to the rotary connector, it is preferable that the flat cable installed therein is capable of conducting a current of 5.5 A or greater and has a heat-resistance of from 80° C. to 275° C.

In order to solve the problems described above, the method for producing a flat cable according to the invention is a method for producing the above-described flat cable, the method including thermally fusing the innermost layers by thermal compression bonding at a temperature that is higher than or equal to the melting point of the polyphenylene sulfide-based resin that constitutes the innermost layer and is lower than the melting point of the polyphenylene sulfide-based resin that constitutes the outermost layer.

In order to solve the problems described above, the method for producing a flat cable according to the invention is a method for producing a flat cable by adhering, by thermal fusion, two sheets of resin films containing polyphenylene sulfide-based resins having different melting points in the form of layer, with conductors being interposed therebetween, the method comprising a step of sending out the conductors and the resin films such that the conductors come into contact with a layer formed from a polyphenylene sulfide-based resin having a lower melting point, and the thermal compression bonding apparatus used for thermal fusion is brought into contact with a layer formed from a polyphenylene sulfide-based resin having a higher melting point; and a step of subjecting the conductors and the resin films thus sent out, to thermal compression bonding using the thermal compression bonding apparatus at a temperature that is higher than or equal to the melting point of the layer contacting the conductors and is lower than the melting point of the layer contacting the thermal compression bonding apparatus.

In order to solve the problems described above, the method for producing a flat cable according to the invention is a method for producing a flat cable by adhering, by thermal fusion, two sheets of resin films containing polyphenylene sulfide-based resins having different melting points in the form of layer, with optical fibers being interposed therebetween, the method comprising a step of sending out the optical fibers and the resin films such that the optical fibers are brought into contact with a layer formed from a polyphenylene sulfide-based resin having a lower melting point and the thermal compression bonding apparatus used for thermal fusion is brought into contact with a layer formed from a polyphenylene sulfide-based resin having a higher melting point; and a step of subjecting the optical fibers and the resin films thus sent out, to thermal compression bonding using the thermal compression bonding apparatus at a temperature that is higher than or equal to the melting point of the layer contacting the optical fibers and is lower than the melting point of the layer contacting the thermal compression bonding apparatus.

In the above-described method for producing a flat cable, the two sheets of resin films containing polyphenylene sulfide-based resins having different melting points in the form of layer have been partially subjected to a crosslinking treatment in advance, and the method comprises a step of sending out the conductors, the optical fibers, and the resin films such that the conductors and the optical fibers are brought into contact with a non-crosslinked layer, while the thermal compression bonding apparatus used for thermal fusion is brought into contact with a crosslinked layer; and a step of subjecting the conductors, the optical fibers, and the resin films thus sent out, to thermal compression bonding using the thermal compression bonding apparatus at a temperature higher than or equal to the melting point of the layer contacting the conductors and the optical fibers.

In regard to the method for producing a flat cable, it is preferable that the resin film has a thickness of from 5 μm to 100 μm, and the layer formed from a PPS-based resin that has a high melting point or has been crosslinked, has a thickness of 1 μm or more.

Effect of the Invention

When the flat cable of the invention, a rotary connector using this flat cable, and a method for producing a flat cable are used, an inexpensive flat cable that is easily producible and has excellent heat resistance, flame retardance and flexibility, and a rotary connector can be realized.

MODE(S) FOR CARRYING OUT THE INVENTION

Hereinafter, embodiments of the invention will be described with reference to the drawings.

Figure 1:
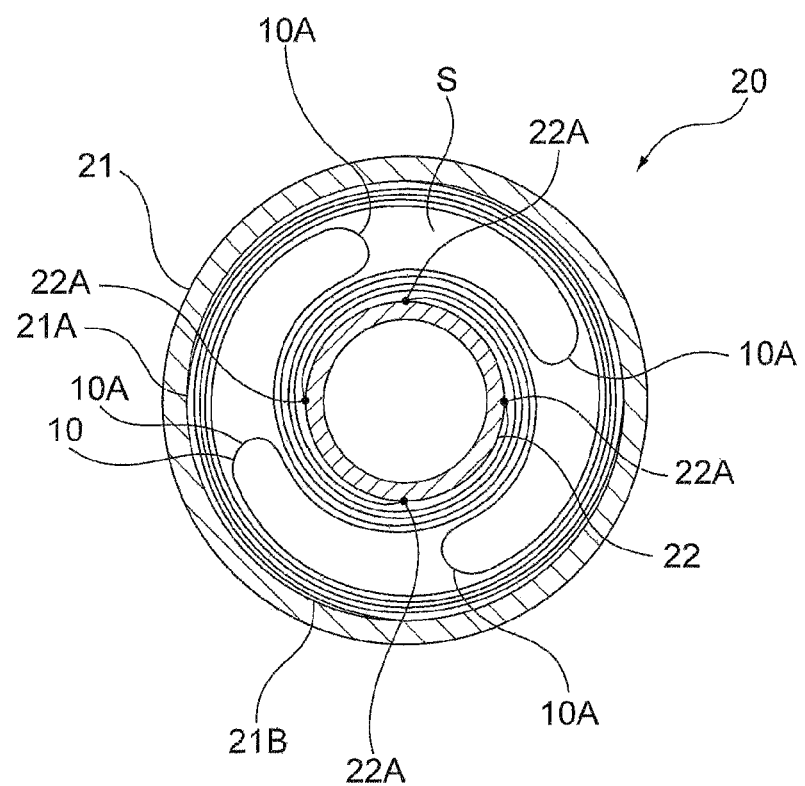
FIG. 1 is a plan view of a transverse section, illustrating an embodiment of a rotary connector having the flat cable according to the invention installed therein.

FIG. 1 is a plan view of a transverse section, illustrating an embodiment of a rotary connector 20 having a flat cable 10 according to the invention installed therein. The rotary connector 20 of the present embodiment is used in, for example, a steering device for an automobile, and the rotary connector is disposed between a steering post, which is a static body, and a steering wheel (not shown together in the diagram), which is a rotating body. The steering device and the vehicle are electrically connected by the flat cable 10 inside the rotary connector 20, and the flat cable 10 accomplishes the role of transmitting signals from the vehicle side or supplying electric power from a power supply to the various switches and devices inside the steering device.

As illustrated in FIG. 1, the rotary connector 20 has an approximately cylindrical-shaped flat exterior case 21 and a rotary part 22, and has the flat cable 10 installed in the gap S between the two components. The exterior case 21 is fixed on the steering post side, while the rotary part 22 is fixed on the steering wheel side, and the two components are connected to each other to be freely rotatable about the same axis.

The flat cable 10 is accommodated in the gap S such that the width direction of the flat cable follows the axial direction of the exterior case 21 and the rotary part 22. One end of the flat cable is connected and fixed to a terminal 21A of the exterior case 21, and the other end is connected and fixed to a terminal 22A of the rotary part 22. The flat cable 10 is disposed such that the one side connected to the terminal 21A is wound around the inner circumferential surface 21B of the exterior case 21 in the counterclockwise direction, and the other one side connected to the terminal 22A is wound around the outer circumferential surface of the rotary part 22 in the clockwise direction. Since the winding directions of the two ends are reverse directions, a bent part 10A at which the direction is reversed exists in the flat cable 10 in the middle region that is not wound around anything. Due to this bent part 10A, the flat cable 10 is configured so as not to stretch out within the range of rotation of the steering wheel (rotary part 22) with respect to the steering post (exterior case 21).

Accordingly, the flat cable 10 needs to have excellent flexibility, and specifically, it is preferable that the minimum bending radius at the bent part 10A is from 3 mm to 8 mm. In a case in which the flat cable cannot bend at a bending radius of 8 mm or less, it becomes difficult to accommodate the bent part 10A in the gap S of the rotary connector 20. Even in a case in which the flat cable could be accommodated forcibly, drawbacks such as rupture of the flat cable 10 at the bent part 10A occur. When the bending radius is 8 mm or less, a smaller bending radius exhibits superior flexibility; however, when the bending radius is less than 3 mm, the flat cable is practically in a folded state. Therefore, flexibility in the range of having a minimum bending radius of less than 3 mm is impractical for accommodation in the rotary connector 20.

It is preferable that the outer surface of the flat cable 10 and the inner circumferential surface 21B of the exterior case 21 are coated with a lubricating agent (not shown in the diagram). Due to the surface tension of the lubricating agent, the flat cable can be wound in a state in which one side of the flat cable 10 is in close contact with the inner circumferential surface 21B of the exterior case 21.

Furthermore, even in a case in which the steering wheel (rotary part 22) has been rotated, winding collapse of the one side of the flat cable 10 can be prevented. The lubricating agent is not particularly limited as long as it provides such an operating effect and is heat-resistant, and agents containing silicone or fluorine, and the like may be used. However, in the present embodiment, a lubricating agent containing an inexpensive hydrocarbon-based material is used.

For a flat cable intended for a vehicle provided with the above-described steering heater function, the flat cable 10 installed in the rotary connector 20 needs to conduct a large current for heating, and it is preferable that the flat cable is capable of conducting a current of at least 5.5 A. Furthermore, it is preferable that the flat cable 10 installed in the rotary connector 20 does not undergo failure even at a high temperature of at least 80° C., in preparation for an occasion in which the vehicle is parked for a long time in hot weather during the summer.

The rotary connector 20 illustrated in FIG. 1 has four flat cables 10 installed therein; however, it is not necessarily essential to have four cables installed. The number of flat cables can be changed as appropriate according to the number of electric wirings needed by the vehicle. In a case in which the number of installed flat cables 10 is 1 to 3, it is preferable that those terminals 21A and 22A to which flat cables 10 are not connected, are connected with further inexpensive dummy cables. Thereby, symmetry of the rotary connector 20 is maintained, and the centroid position is maintained.

Furthermore, in accordance with further multi-circuiting of vehicles, the number of installments of the flat cable 10 may be 5 or more. However, as shown in FIG. 1, it is preferable that a plurality of flat cables 10 is disposed evenly on the circumference, and the flat cables are accommodated such that the bent parts 10A of the flat cables 10 do not come into contact with each other even in a case in which the steering wheel (rotary part 22) has been rotated. Generation of abnormal noise caused by contact and the like can be prevented.

Figure 2:
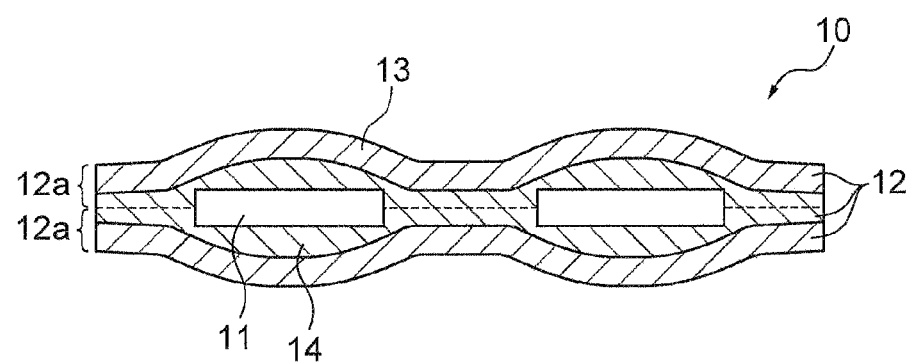
FIG. 2 is a cross-sectional view in the width direction illustrating an embodiment of the flat cable according to the invention, the diagram illustrating an example of embedding copper foil as a conductor.

Next, the details of the flat cable 10 according to the present embodiment will be described with reference to FIG. 2. FIG. 2 shows a cross-sectional view in the width direction of the flat cable 10. The flat cable 10 has a plurality of conductors 11 arrayed therein; and an insulating layer 12 covering the periphery of the conductors 11. The conductor 11 is a copper foil; however, the conductor is not limited to this and may be formed from any electrically conductive material.

In the diagram, two conductors 11 having an identical cross-sectional shape and an identical cross-sectional area are shown. However, it is not necessary for the cross-sectional shape and the cross-sectional area to be identical, and the number of conductors 11 to be embedded is not limited to two. Furthermore, the distance between the conductors 11 is not limited as long as the conductors 11 are electrically insulated, and the distance can be changed as appropriate according to the desired specifications.

As shown in FIG. 2, the insulating layer 12 includes a plurality of layers in a layered form. The insulating layer 12 has at least an outermost layer 13 that is in contact with the outside; and an innermost layer 14 that is adhered to the conductors 11. The insulating layer 12 may have an intermediate layer (not shown in the diagram) between the outermost layer 13 and the innermost layer 14. Here, the outermost layer 13 and the innermost layer 14 are both formed from PPS-based resins. In a case in which the insulating layer has an intermediate layer, the constituent material is not limited to a PPS-based resin.

As such, when the insulating layer 12 has a structure having a plurality of layers including the outermost layer 13 and the innermost layer 14, and the melting point (designated as melting point X) of the PPS-based resin that constitutes the innermost layer 14 is adjusted to be lower by 5° C. or more than the melting point (designated as melting point Y) of the PPS-based resin that constitutes the outermost layer 13, in a temperature range of higher than or equal to the melting point X and lower than the melting point Y, the PPS-based resin of the innermost layer 14 can be melted in a state in which the PPS-based resin of the outermost layer 13 is not melted. Thereby, in the production method that will be described below, when two sheets of resin films 12a that serve as the insulating layer 12 are thermally fused, with the conductors 11 being interposed therebetween, in a temperature range of higher than or equal to the melting point X and lower than the melting point Y, the innermost layer 14 melts as a result of thermal fusion and can cover the periphery of the conductors 11 without a gap. On the other hand, since the outermost layer 13 does not melt, the insulating layer 12 formed from PPS-based resins can be formed without having a problem that the conductors 11 and the like to be installed therein penetrate through the insulating layer and become exposed at the surface of the flat cable 10.

Regarding the outermost layer 13 and the innermost layer 14, a difference in the melting point of 5° C. or higher can be provided by adjusting the compositions themselves of the PPS-based resins that constitute the outermost layer and the innermost layer, respectively. Furthermore, even if the compositions of the PPS-based resins are the same, a difference in the presence or absence of melting can be provided by applying a crosslinking treatment. That is, in order to enable prevention of melting through a crosslinking treatment, when a crosslinked layer is disposed as the outermost layer 13, while a non-crosslinked layer is disposed as the innermost layer 14, and the PPS-based resins that constitute the outermost layer 13 and the innermost layer 14 are heated to a temperature that is higher than or equal to the melting point, it is made possible to melt the innermost layer, without melting the outermost layer.

<Production Method>

Figure 3:
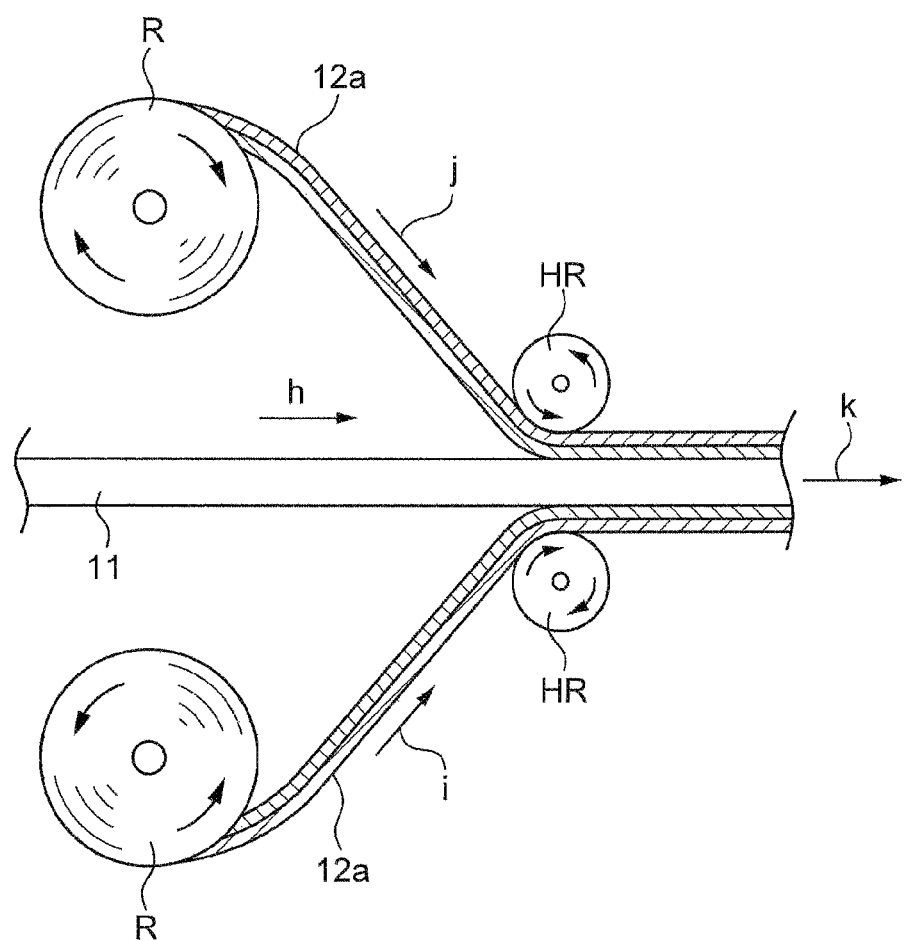
FIG. 3 is a schematic cross-sectional view illustrating the method for producing a flat cable according to the invention.

Next, a method for producing the flat cable 10 of the present embodiment will be described with reference to FIG. 3. FIG. 3 is a schematic cross-sectional view illustrating the production method of the present embodiment, and an example of using copper foil as the conductor 11 is illustrated therein. However, the production method is not limited to this, and as long as the conductor is formed from an electrically conductive material, any flat cable 10 can be produced by a similar method.

As illustrated in FIG. 3, conductors 11 are sent out in an arrayed state from a plurality of bobbins (not shown in the diagram) in the direction of arrow h. Meanwhile, resin films 12a formed from PPS-based resins are sent out from two delivery rolls R, one sheet from each delivery roll, in the directions of arrows i and j, respectively. The resin films 12a are introduced in between the roll surfaces of a pair of heating rolls HR, together with the conductors 11, in a state of being in contact with the upper surface and the lower surface of the conductors 11, and the resin films are subjected to thermal compression bonding. Thus, a flat cable 10 is obtained. The thermally compressed flat cable 10 is cooled while being pulled by a winding roll (not shown in the diagram) in the direction of arrow k, and the cooled flat cable is wound around the winding roll. The heating rolls HR are not limited to these as long as an apparatus capable of thermal compression bonding is used, and a hot press or the like may also be used.

The resin film 12a includes a plurality of layers of PPS-based resins having different melting points in a layered form. When the resin films are sent out from the delivery rolls R, the resin films are sent out in a state of being disposed such that the conductors 11 come into contact with a layer formed from a PPS-based resin having a lower melting point (designated as melting point X), and the heating roll HR comes into contact with a layer formed from a PPS-based resin having a higher melting point (designated as melting point Y). When the resin films 12a thus sent out are heated by the heating rolls HR in a temperature range of higher than or equal to the melting point X and lower than the melting point Y, the PPS-based resin of the layer contacting the heating roll HR does not melt because the temperature is not above the melting point Y, and the PPS-based resin of the layer contacting the conductors 11 melts because the resin is heated at a temperature higher than or equal to the melting point X. Thereby, the PPS-based resin of the layer contacting the conductors 11 becomes liquid as a result of melting, and as a result of compression bonding, the PPS-based resin goes around the periphery of the conductors 11 as shown in FIG. 2, while the resin films 12a are thermally fused with each other in the regions between the conductors 11 (dotted lined part in FIG. 2).

Meanwhile, since the PPS-based resin of the layer contacting the heating roll HR does not melt, a problem such as exposure of the conductors 11 does not occur. Furthermore, since the PPS-based resin of the layer contacting the heating roll HR does not melt, a defect that the conductors 11 freely move around in the width direction and the flat cable 10 is not produced so as to have the dimension in the width direction as originally designed, do not occur.

As such, the layer adhered to the conductors 11 becomes the innermost layer 14 described above, and the layer contacting the outside such as the heating roll HR becomes the outermost layer 13 described above.

It is desirable that the melting point X is lower by 5° C. or more than the melting point Y. In a case in which the temperature difference is less than 5° C., it is difficult to control the heating of the resin film 12a to a temperature range higher than or equal to the melting point X and lower than melting point Y by means of the heating rolls HR. It is because when the temperature becomes higher than or equal to the melting point Y, all of the layers are melted, or when the temperature becomes lower than the melting point X, none of the layers are melted.

Furthermore, it is preferable that the layer contacting the heating roll HR has a certain thickness, because drawbacks such as that the outermost layer 13 is torn away, and the conductors 11 and the like installed therein penetrate through the outermost layer and become exposed at the surface of the flat cable 10, are avoided. Specifically, it is preferable that the thickness of the resin film 12a is from 5 μm to 100 μm, and the thickness of the layer formed from a PPS-based resin having a higher melting point (outermost layer) is 1 μm or more.

For the melting point, a difference of 5° C. or more can be provided by making the compositions themselves of the PPS-based resins different. In the process of the previous step illustrated in FIG. 3, two sheets of PPS-based resin films having different compositions can be bonded together by thermal fusion, chemical adhesion using an adhesive, or the like, and thus the resin film 12a can be obtained. In the case of using an adhesive, a layer formed from the adhesive becomes an intermediate layer (not shown in the diagram) between the outermost layer 13 and the innermost layer 14.

In the previous step of the process illustrated in FIG. 3, when one surface of the resin film 12a is subjected to a crosslinking treatment by chemical crosslinking by incorporation of a crosslinking agent, irradiation with an electron beam, or the like, a layer that does not melt is formed. Therefore, a PPS-based resin film 12a having a surface that does melts and a surface that does not melt can be realized.

By subjecting the resin film 12a thus obtained to thermal compression bonding in a state of having the conductors 11 interposed therebetween, a flat cable 10 that uses PPS-based resins in the insulating layer 12 can be easily produced. Regarding the thickness, width, sequence, and the like of the conductors 11, since conductors having desired thickness, width, sequence, and the like are selected at the time of sending out, and the conductors are interposed between the resin films 12a and compressed, there is no need to change the production line or the like in accordance with the specifications of the conductors 11. Therefore, the quantity of facility investment is reduced, and production at low cost can be achieved, compared to a production method based on extrusion molding where different nozzle caps are needed for different specifications of the conductors 11.

Furthermore, at the time of performing thermal compression bonding of two sheets of resin films 12a with conductors 11 interposed therebetween, since molten PPS-based resin layers go evenly around the periphery of the conductors 11, even in the case of including conductors having different thicknesses or widths, the insulating layer 12 (insulating coating) can be produced uniformly. Therefore, the problem that the resin is not introduced uniformly in regions where the distance between the conductors is large and in regions where the distance is small, which is observed in those production methods based on extrusion molding, does not occur. Since production is easy as such, the degree of freedom in design in terms of the thickness, width, sequence, interval, and the like of the conductors is also high.

In the case of using a hot press, an outermost layer formed from a PPS-based resin having a high melting point and an innermost layer formed from a PPS-based resin having a low melting point may be prepared as different resin films 12a1 and 12a2, respectively, and (1) resin film 12a1, (2) resin film 12a2, (3) conductors 11, (4) resin film 12a2, and (5) resin film 12a1 may be overlapped in this order and subjected to thermal compression bonding. Also, in the case of using heating rolls HR, a similar flat cable 10 can be produced by separately sending out the above-mentioned items (1) to (5), and overlapping them in the order of (1) to (5) at the time of introducing the items into the heating rolls HR.

Figure 4:
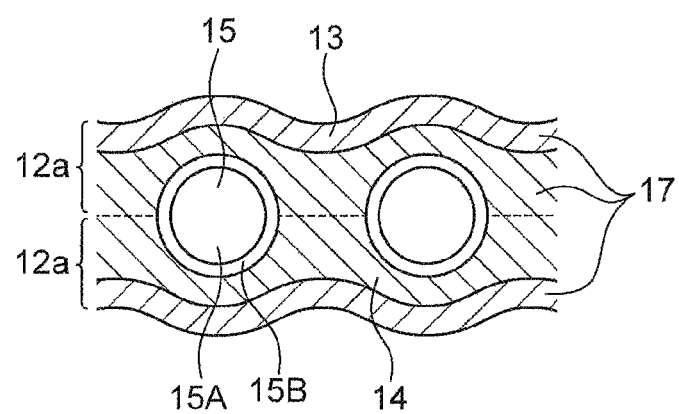
FIG. 4 is a cross-sectional view in the width direction illustrating an embodiment of the flat cable according to the invention, the diagram illustrating an example of embedding optical fibers.

Thus, embodiments of the invention have been explained; however, the invention is not intended to be limited to the embodiments described above, and various modifications can be carried out to the extent that the gist of the invention is maintained. For example, the conductors 11 may be changed as will be described in the Examples described below, and optical fibers 15 that propagate optical signals may be embedded in a protective layer 17 (see FIG. 4). Furthermore, conductors of different kinds, such as copper foil and optical fibers, may be embedded in combination in the same flat cable 10.

Furthermore, as another embodiment of the production method, a copper foil is bonded to one sheet of resin film 12a such that the copper foil comes into contact with a layer formed from a PPS-based resin having a low melting point, and thereby, a copper-clad film is produced. Conductors 11 arrayed on the resin film 12a may be formed by subjecting this copper-clad film to etching processing. When the conductors 11 arrayed on the resin film 12a as such and another one sheet of resin film 12a are subjected to thermal compression bonding with heating rolls HR or the like such that a layer formed from a PPS-based resin having a low melting point comes into contact with the conductors 11, the flat cable 10 of the present embodiment can be produced.

EXAMPLES

Next, in order to further clarify the effects of the invention, Examples and Comparative Examples will be described in detail; however, the invention is not intended to be limited to these Examples. Examples are equivalent to the flat cable 10 explained in the embodiments described above and a rotary connector 20 having this flat cable installed therein, and satisfy all of the following conditions.

(Condition 1) The outermost layer and the innermost layer are formed from PPS-based resins.

(Condition 2) The melting point of the PPS-based resin that forms the innermost layer is lower by 5° C. or more than the melting point of the PPS-based resin that forms the outermost layer, or the outermost layer is a crosslinked layer, while the innermost layer is a non-crosslinked layer.

(Condition 3) The thickness of the resin film is from 5 μm to 100 μm, and the thickness of the outermost layer is 1 μm or more.

In the Examples, the outermost layer formed from a PPS-based resin having a high melting point and the innermost layer formed from a PPS-based resin having a low melting point were prepared as different resin films 12a1 and 12a2, respectively, and a flat cable 10 was produced by overlapping (1) resin film 12a1, (2) resin film 12a2, (3) conductors 11 or optical fibers 15, (4) resin film 12a2, and (5) resin film 12a1 in this order and subjecting the assembly to hot pressing.

Examples 1 to 3

Resin films having the melting points and film thicknesses indicated in Table 1, and a plurality of pieces of copper foil each having a width of 0.5 to 10 mm and a thickness of 35 μm as conductors 11 were used, and the films and the conductors were subjected to thermal compression bonding at 260° C. The difference of Examples 1 to 3 is only the film thicknesses of the resin films 12a1 and 12a2 of the outermost layer and the innermost layer.

Example 4

Resin films having the melting points and film thicknesses indicated in Table 1, and a plurality of pieces of aluminum foils each having a width of 0.5 to 10 mm and a thickness of 8 μm as conductors 11 were used, and the films and the conductors were subjected to thermal compression bonding at 250° C.

Example 5

Resin films having the melting points and film thicknesses indicated in Table 1, and a plurality of pieces of copper foil each having a width of 0.5 to 10 mm and a thickness of 35 μm as conductors 11 were used, and the films and the conductors were subjected to thermal compression bonding at 260° C. An adhesive (intermediate layer) indicated in Table 1 was also used between the resin films 12a2 and 12a1 of the innermost layer and the outermost layer.

Example 6

Resin films having the melting points and film thicknesses indicated in Table 1, and a plurality of pieces of copper foil each having a width of 0.5 to 10 mm and a thickness of 35 μm as conductors 11 were used, and the films and the conductors were subjected to thermal compression bonding at 277° C.

Example 7

Resin films having the melting points and film thicknesses indicated in Table 1, and a plurality of pieces of copper foil each having a width of 0.5 to 10 mm and a thickness of 35 μm as conductors 11 were used, and the films and the conductors were subjected to thermal compression bonding at 260° C. The outermost layer was a layer in a state of being made unmeltable by applying a crosslinking treatment to the layer by preliminary irradiation with an electron beam. The innermost layer was not subjected to a crosslinking treatment.

Example 8

Resin films having the melting points and film thicknesses indicated in Table 1, and a plurality of pieces of an optical fiber 15 having an outer diameter of about 1 mm, in which core 15A was formed from a polymethyl methacrylate-based rein (PMMA) and clad 15B was formed from a fluorine-based material, were used, and the films and the optical fibers were subjected to thermal compression bonding at 260° C.

Example 9

Resin films having the melting points and film thicknesses indicated in Table 1, and a plurality of pieces of copper foil each having a width of 0.5 to 10 mm and a thickness of 35 μm as conductors 11 were used, and the films and the conductors were subjected to thermal compression bonding at 260° C. An intermediate layer formed from a PPS-based resin layer indicated in Table 1 was also formed between the innermost layer and the outermost layer.

That is, a resin film 12b that served as an intermediate layer was inserted respectively between (1) resin film 12a1 and (2) resin film 12a2, and between (4) resin film 12a2 and (5) resin film 12a1 described above.

In order to make a comparison with the Examples, flat cables as Comparative Examples were produced. Unlike the Examples, the Comparative Examples did not satisfy at least one of the above-described three conditions.

Comparative Example 1

Comparative Example 1 did not satisfy the above-described Condition 1.

A film having a two-layer structure in which the outermost layer was a layer formed from a polyester (PET)-based resin having a melting point of 250° C. and the innermost layer was a layer formed from a flame-retardant polyester-based adhesive having a melting point of 120° C., and having a film thickness indicated in Table 2, was used as the resin film. The resin film was formed by applying a flame-retardant polyester-based adhesive dissolved in a solvent on the PET-based resin film as the outermost layer, and drying the adhesive. Two sheets of the resin film formed as such were prepared, and a plurality of pieces of copper foil each having a width of 0.5 to 10 mm and a thickness of 35 μm were interposed between the two sheets. The assembly was subjected to thermal compression bonding at 160° C., and thereby a flat cable was produced.

Comparative Example 2

Comparative Example 2 did not satisfy the first part of the above-described Condition 3.

An outermost layer formed from a PPS-based resin having a high melting point and an innermost layer formed from a PPS-based resin having a low melting point were prepared as different resin films 12a1 and 12a2, respectively, and (1) resin film 12a1, (2) resin film 12a2, (3) conductors 11, (4) resin film 12a2, and (5) resin film 12a1 were overlapped in this order. The assembly was subjected to hot pressing, and thereby a flat cable 10 was produced.

Resin films having the melting points and film thicknesses indicated in Table 2, and a plurality of pieces of copper foil each having a width of 0.5 to 10 mm and a thickness of 35 μm as conductors 11 were used, and the films and the conductors were subjected to thermal compression bonding at 260° C.

Comparative Example 3

Comparative Example 3 did not satisfy the second part of the above-described Condition 3.

As the resin film, a film having a single layer structure in which there was no outermost layer (thickness of the outermost layer was 0), and the innermost layer was formed from a PPS-based resin having a melting point of 250° C., and having a film thickness indicated in Table 2, was used.

Comparative Example 4

Comparative Example 4 did not satisfy the above-described Condition 1.

An outermost layer formed from a heat-resistant cycloolefin-based resin having a high melting point and an innermost layer formed from a PPS-based resin having a low melting point were prepared as different resin films 12a1 and 12a2, respectively, and (1) resin film 12a1, (2) resin film 12a2, (3) conductors 11, (4) resin film 12a2, and (5) resin film 12a1 were overlapped in this order. The films and the conductors were subjected to hot pressing, and thus a flat cable 10 was produced.

Resin films having the melting points and film thicknesses indicated in Table 2, and a plurality of pieces of copper foil each having a width of 0.5 to 10 mm and a thickness of 35 μm as conductors 11 were used, and the films and the conductors were subjected to thermal compression bonding at 260° C. An adhesive (intermediate layer) indicated in Table 2 was also used between the innermost layer and the outermost layer.

Comparative Example 5

Comparative Example 5 did not satisfy the above-described Condition 1.

A film having a two-layer structure in which the outermost layer was a layer formed from a PPS-based resin having a melting point of 280° C. and the innermost layer was a layer formed from a flame-retardant polyester-based adhesive having a melting point of 120° C., and having a film thickness indicated in Table 2, was used as the resin film. The resin film was formed by applying a flame-retardant polyester-based adhesive dissolved in a solvent on the PPS-based resin film as the outermost layer, and drying the adhesive. Two sheets of the resin film formed as such were prepared, and a plurality of pieces of copper foil each having a width of 0.5 to 10 mm and a thickness of 35 μm were interposed between the two sheets. The assembly was subjected to thermal compression bonding at 160° C., and thereby a flat cable was produced.

The flat cables of Examples 1 to 9 and Comparative Examples 1 to 5 were cut to a predetermined width and a predetermined length, and then a bending resistance test and a flame resistance test were performed. For a rotary connector having these flat cables installed as illustrated in FIG. 1 and having the flat cables and the inner circumferential surface of the exterior case coated with a lubricating agent containing a hydrocarbon-based material, a durability test and a test for operation after parking for a long time in hot weather during the summer were performed. These test results are shown in Tables 1 and 2.

<Test for Bending Resistance of Flat Cable>

A bending test was carried out by repeating an operation of bending or stretching straight a flat cable at a bending radius of 8 mm at normal temperature (25° C.), 80° C., and 130° C., and measuring the number of times until the internal conductors broke. Therefore, as the numbers of the test results shown in Tables 1 and 2 are larger, superior bending resistance is obtained.

<Test for Flame Retardance of Flat Cable>

The flame retardance test was carried out according to VW-1 of UL1581 (vertical combustion test).

<Test for Durability of Rotary Connector>

The durability test was carried out by rotating a rotary connector counterclockwise and clockwise two times each at a rate of one rotation per second at 80° C. and 130° C., and measuring the number of times to reach breaking of flat cables. In Tables 1 and 2, the ratio of the number of times in the case in which the measured value in Comparative Example 1 (conventional product) was denoted as 1.0 is described. Therefore, as the numbers of the test results shown in Tables 1 and 2 are larger, superior durability is obtained.

<Test for Operation of Rotary Connector after Parking for Long Time in Hot Weather During Summer>

An automobile left in a parking place that is exposed to direct sunlight in the midsummer was assumed, and a rotary connector was left in a constant temperature chamber at 80° C. for 8 hours and then was rapidly cooled. The temperature of the entire connector was lowered to −30° C., subsequently the axis of rotation was rotated, and the operation was checked. The case in which the rotary connector did not operate smoothly due to excessive rotational torque, winding collapse of flat cables, and the like, or abnormal noise that is generated when the flat cables rises up from the inner surface of the exterior case of the rotary connector was generated, was rated as X; and the case in which the flat cables did not rise up and operated normally at a rate of ±2 rotations each, was rated as ○.

TABLE 1

|  |  | Example 1 | Example 2 | Example 3 | Example 4 | Example 5 |
|---|---|---|---|---|---|---|
| Outermost layer | Type | | | PPS-based resin | | |
| | Melting point (° C.) | 280 | 280 | 280 | 280 | 280 |
| | Thickness (μm) | 25 | 25 | 50 | 1 | 18 |
| Intermediate layer | | — | — | — | — | Epoxy-based primer (1 μm thick) |
| Innermost layer | Type | | | PPS-based resin | | |
| | Melting point (° C.) | 250 | 250 | 250 | 250 | 250 |
| | Thickness (μm) | 25 | 10 | 50 | 4 | 25 |
| Embedded material | | 35-μm thick copper foil | 35-μm thick copper foil | 35-μm thick copper foil | 8-μm thick aluminum foil | 35-μm thick copper foil |
| Test for bending resistance of flat cable (number of times of bending) | Normal temperature (10,000 times) | >1000 | >1000 | >1000 | 200 | >1000 |
| | 80° C. (10,000 times) | >1000 | >1000 | 100 | 100 | >1000 |
| | 130° C. (10,000 times) | >1000 | >1000 | 100 | 100 | >1000 |
| Test for flame retardance of flat cable | | ○ | ○ | ○ | ○ | ○ |
| Test for durability of rotary connector | 80° C. | 1.5 | 1.5 | 1.0 | 1.0 | 1.5 |
| | 130° C. | 3.0 | 3.0 | 1.5 | 1.5 | 3.0 |

TABLE 1-continued

|  |  | Example 6 | Example 7 | Example 8 | Example 9 |
|---|---|---|---|---|---|
| (ratio of number of times of rotational durability) | | | | | |
| Operation of rotary connector after parking for long time in hot weather during summer | | ○ | ○ | ○ | ○ |
| Comprehensive evaluation | | ⊙ | ⊙ | ○ | ⊙ |

|  |  | Example 6 | Example 7 | Example 8 | Example 9 |
|---|---|---|---|---|---|
| Outermost layer | Type | PPS-based resin | PPS-based resin subjected to crosslinking treatment | PPS-based resin | PPS-based resin |
|  | Melting point (° C.) | 280 | 250 | 280 | 280 |
|  | Thickness (μm) | 25 | 1 | 25 | 25 |
| Intermediate layer | | — | — | — | PPS-based resin (melting point: 275° C., thickness: 5 μm) |
| Innermost layer | Type | PPS-based resin | PPS-based resin | PPS-based resin | PPS-based resin |
|  | Melting point (° C.) | 275 | 250 | 250 | 250 |
|  | Thickness (μm) | 25 | 24 | 50 | 20 |
| Embedded material | | 35-μm thick copper foil | 35-μm thick copper foil | Optical fibers (outer diameter: 1 mm) | 35-μm thick copper foil |
| Test for bending resistance of flat cable (number of times of bending) | Normal temperature (10,000 times) | >1000 | >1000 | 500 | >1000 |
|  | 80° C. (10,000 times) | >1000 | >1000 | 200 | >1000 |
|  | 130° C. (10,000 times) | >1000 | >1000 | 100 | >1000 |
| Test for flame retardance of flat cable | | ○ | ○ | ○ | ○ |
| Test for durability of rotary connector (ratio of number of times of rotational durability) | 80° C. | 1.5 | 1.5 | 1.5 | 1.5 |
|  | 130° C. | 3.0 | 3.0 | 3.0 | 3.0 |
| Operation of rotary connector after parking for long time in hot weather during summer | | ○ | ○ | ○ | ○ |
| Comprehensive evaluation | | ⊙ | ⊙ | ○ | ⊙ |

As shown in Table 1, with regard to the flat cables of Examples 1 to 9, satisfactory results were obtained in the bending resistance test and the flame retardance test. Furthermore, with regard to the rotary connectors having these flat cables installed therein, satisfactory results were obtained in the durability test and the test for operation after parking for a long time in hot weather during the summer. These test results were comprehensively evaluated. Since Examples 1, 2, 5, 6, 7, and 9 showed particularly excellent bending resistance of flat cables, those Examples were regarded as best products and were rated as ⊙; and Examples other than those were regarded as good products and were rated as ○.

TABLE 2

|  |  | Comparative Example 1 | Comparative Example 2 | Comparative Example 3 | Comparative Example 4 | Comparative Example 5 |
|---|---|---|---|---|---|---|
| Outermost layer | Type | PET-based resin | PPS-based resin | PPS-based resin | Heat-resistant cycloolefin-based resin | PPS-based resin |
|  | Melting point (° C.) | 250 | 280 | — | 265 | 280 |
|  | Thickness (μm) | 25 | 1 | 0 | 25 | 25 |
| Intermediate layer | | — | — | — | Epoxy-based primer (1 μm thick) | — |
| Innermost layer | Type | Flame-retardant polyester-based adhesive | PPS-based resin | PPS-based resin | PPS-based resin | Flame-retardant polyester-based adhesive |
|  | Melting point (° C.) | 120 | 250 | 250 | 250 | 120 |
|  | Thickness (μm) | 25 | 2 | 25 | 25 | 25 |

TABLE 2-continued

|  |  | Comparative Example 1 | Comparative Example 2 | Comparative Example 3 | Comparative Example 4 | Comparative Example 5 |
|---|---|---|---|---|---|---|
| Embedded material |  | 35-μm thick copper foil | — | — | 35-μm thick copper foil | 35-μm thick copper foil |
| Test for bending resistance of flat cable (number of times of bending) | Normal temperature (10,000 times) | >1000 | 100 | — | >1000 | >1000 |
|  | 80° C. (10,000 times) | 100 | 20 | — | 200 | 100 |
|  | 130° C. (10,000 times) | 50 | 10 | — | 100 | 50 |
| Test for flame retardance of flat cable |  | ○ | ○ | — | X | ○ |
| Test for durability of rotary connector (ratio of number of times of rotational durability) | 80° C. | 1.0 | — | — | 0.2 | 1.0 |
|  | 130° C. | 1.0 | — | — | 0.1 | 1.0 |
| Operation of rotary connector after parking for long time in hot weather during summer |  | X | — | — | ○ | X |
| Comprehensive evaluation |  | X | X | X | X | X |

In contrast, in regard to a rotary connector having the flat cable of Comparative Example 1 in Table 2 installed therein, defects such as the occurrence of abnormal noise or winding collapse occurred in a test for operation after parking for a long time in hot weather during the summer. Thus, in the comprehensive evaluation, Comparative Example 1 was rated as X.

With regard to the flat cable of Comparative Example 2, the numbers of times of bending at 80° C. and 130° C. were 200,000 times and 100,000 times, respectively, and the flat cable did not satisfy the specifications for installment in a rotary connector. Therefore, in the comprehensive evaluation, Comparative Example 2 was regarded as a defective product and was rated as X.

With regard to the flat cable of Comparative Example 3, there occurred a defect that the installed conductors 11 and the like penetrate through and become exposed at the surface of the flat cable 10 in the production process, and production itself could not be achieved. Therefore, in the comprehensive evaluation, Comparative Example 3 was rated as X.

The flat cable of Comparative Example 4 was unacceptable in the flame retardance test. Furthermore, in a case in which the flat cable was installed in a rotary connector, the flat cable was swollen by a lubricating agent containing a hydrocarbon-based material that was applied on the outer surface, and the thickness became non-uniform. Consequently, poor results were obtained in the test for durability of the rotary connector. Therefore, in the comprehensive evaluation, Comparative Example 4 was rated as X.

With regard to the flat cable of Comparative Example 5, there occurred a defect of abnormal noise or winding collapse occurring in the test for operation after parking for a long time in hot weather during the summer. Therefore, in the comprehensive evaluation, Comparative Example 5 was regarded as a defective product and was rated as X.

EXPLANATIONS OF LETTERS OR NUMERALS

10 FLAT CABLE
11 CONDUCTOR
12 INSULATING LAYER
12*a* RESIN FILM
13 OUTERMOST LAYER
14 INNERMOST LAYER
15 OPTICAL FIBER
17 PROTECTIVE LAYER
20 ROTARY CONNECTOR
21 EXTERIOR CASE
21B INNER CIRCUMFERENTIAL SURFACE OF EXTERIOR CASE
22 ROTARY PART
HR HEATING ROLL (THERMAL COMPRESSION BONDING APPARATUS)

The invention claimed is:

1. A rotary connector comprising a flat cable comprising:
a plurality of arrayed conductors; and
an insulating layer covering the periphery of the conductors with a film coating,
wherein the insulating layer includes an outermost layer and an innermost layer contacting the conductors, wherein the innermost layer comprises a plurality of layers that are thermally fused to one another,
the outermost layer and the innermost layer are both formed from polyphenylene sulfide-based resins having a melting temperature lower than a melting temperature of the plurality of arrayed conductors, and
the melting point of the polyphenylene sulfide-based resin constituting the innermost layer is lower by 5° C. or more than the melting point of the polyphenylene sulfide-based resin constituting the outermost layer,
wherein the outer surface of the installed flat cable and the inner circumferential surface of an exterior case are coated with a lubricating agent containing a hydrocarbon-based material, and
wherein the outermost layer is a crosslinked layer while the innermost layer is a non-crosslinked layer.

2. The rotary connector according to claim 1, wherein the minimum bending radius of the installed flat cable is from 3 mm to 8 mm.

3. The rotary connector according to claim 2, wherein the installed flat cable is capable of conducting a current of 5.5 A or greater and has a heat-resistance of from 80° C. to 275° C.

4. The rotary connector according to claim 1, wherein the installed flat cable is capable of conducting a current of 5.5 A or greater and has a heat-resistance of from 80° C. to 275° C.

5. The flat cable according to claim 1, wherein the outermost layer and the innermost layer are both formed entirely from polyphenylene sulfide-based resins.

* * * * *